United States Patent
Jain et al.

(10) Patent No.: US 11,756,301 B2
(45) Date of Patent: Sep. 12, 2023

(54) SYSTEM AND METHOD FOR AUTOMATICALLY DETECTING AND MARKING LOGICAL SCENES IN MEDIA CONTENT

(71) Applicant: PRIME FOCUS TECHNOLOGIES LIMITED, Bengaluru (IN)

(72) Inventors: Suvrat Jain, Bandel (IN); Muralidhar Kolar Sridhar, Bengaluru (IN)

(73) Assignee: PRIME FOCUS TECHNOLOGIES LIMITED, Bengaluru (IN)

( * ) Notice: Subject to any disclaimer, the term of this patent is extended or adjusted under 35 U.S.C. 154(b) by 47 days.

(21) Appl. No.: 17/235,197

(22) Filed: Apr. 20, 2021

(65) Prior Publication Data
US 2021/0326599 A1 Oct. 21, 2021

(51) Int. Cl.
*G06V 20/00* (2022.01)
*G06V 20/40* (2022.01)
*G06V 10/74* (2022.01)

(52) U.S. Cl.
CPC ............ *G06V 20/49* (2022.01); *G06V 10/761* (2022.01); *G06V 20/46* (2022.01)

(58) Field of Classification Search
CPC ...... G06V 20/49; G06V 20/46; G06V 10/761; G06V 20/48; G06K 9/6215
See application file for complete search history.

(56) References Cited

U.S. PATENT DOCUMENTS

| | | | |
|---|---|---|---|
| 10,015,503 B1 * | 7/2018 | Ahammad | G06F 18/24147 |
| 10,140,515 B1 * | 11/2018 | Waldo | G06F 16/639 |
| 10,943,126 B2 * | 3/2021 | Guo | G06T 7/0002 |
| 2013/0235275 A1 * | 9/2013 | Kumar | H04N 5/144 348/700 |
| 2017/0083770 A1 * | 3/2017 | Carlson | G06V 20/698 |
| 2021/0201004 A1 * | 7/2021 | Yadav | G06V 40/20 |

FOREIGN PATENT DOCUMENTS

EP 3340069 A1 * 6/2018

* cited by examiner

*Primary Examiner* — Emily C Terrell
*Assistant Examiner* — Ahmed A Nasher
(74) *Attorney, Agent, or Firm* — Barry Choobin; PATENT 360LLC

(57) ABSTRACT

A system including a scene detection engine (SDE) and a method for automatically detecting and marking logical scenes in media content using artificial intelligence are provided. The SDE detects boundaries of shots in media content. The SDE generates an image similarity matrix by extracting color features from a middle frame of each shot. The SDE generates an audio similarity matrix by extracting audio features of each shot. The SDE generates a resultant similarity matrix from the image and audio similarity matrices. The SDE executes a clustering algorithm using the resultant similarity matrix with reduced or no noise to generate an ordered sequence of shots that define a boundary of each scene of the media content. The SDE executes a linear traversal algorithm on the shots that define the boundary of each scene for correcting errors in the defined boundary of each scene.

18 Claims, 10 Drawing Sheets

FIG. 11

SYSTEM AND METHOD FOR AUTOMATICALLY DETECTING AND MARKING LOGICAL SCENES IN MEDIA CONTENT

CROSS-REFERENCE TO RELATED APPLICATIONS

This application claims the priority and the benefit of the Indian Provisional Patent Application with number IN 202041016993, filed in the Indian Patent Office on Apr. 20, 2020 and entitled "System and Method for Automatically Detecting and Marking Logical Scenes in Media Content", the contents of which is included entirely as reference herein.

BACKGROUND

Technical Field

The embodiments herein, in general, relate to analyzing and processing media content. More particularly, the embodiments herein relate to a system and a method for automatically detecting and marking logical scenes in media content using artificial intelligence.

Description of the Related Art

With increasing cements in computer networking and internet technologies and their accessibility, the creation, editing, and consumption of media content has grown rapidly. As the distribution of media content in computer systems and networks is increasing, there are several challenges in handling media assets, for example, videos, because video images are represented by extensive, redundant, and unstructured data streams that span a time sequence. Content owners, broadcasters, and studios in the media and entertainment industry require their media assets, for example, videos, to be catalogued, and require metadata to be extracted and stored in such a way that the discovered metadata is contextual. Metadata discovery and search aid these entities to quickly identify relevant content from their large archives which span, for example, about thousands to hundreds of thousands of hours. Video segmentation is typically performed for structural analysis of videos and content-based management of videos.

A video is typically composed of multiple scenes, each of which is composed of shots. Each shot represents a continuous action in time and space. In the field of video processing, shot detection allows an automated detection of transitions between shots in a video. Shot detection is a preliminary step in automated indexing and content-based video searching, retrieval, and cataloguing applications. The transitions between shots are of two types, that is, abrupt transitions where there are sudden discontinuities in the sequence of frames that constitute a shot, and gradual transitions where there are slow changes in the sequence of frames.

As video shots are typically small in duration and do not provide logical and meaningful insights of the video content, shots are grouped into logical and semantic or meaningful sections of the video, herein referred to as "scenes". As part of a cataloguing process, scenes are typically marked manually by trained human operators. Manual video segmentation is subjective and depends on judgements made by the trained human operators, which may result in an inconsistent, inaccurate, and/or incomplete segmentation of videos.

Automated video segmentation engines, for example, video indexers, scene detection engines, etc., automatically segment videos into scenes based on structural and contextual attributes. These video segmentation engines determine when a scene changes based on visual cues. Discovered metadata is stored in these contextual units. The discovered metadata aids in providing precise boundaries of the scenes which can be later used to create promotional videos, trailers, screeners, and smaller digestible content. However, conventional video segmentation engines perform automated identification or marking of scenes, typically with low precision.

Artificial Intelligence (AI) and Machine Learning (ML) are used in various fields including media applications, for example, computer vision, sentiment analysis, automatic cataloguing, etc. An AI engine that catalogues content automatically, cannot identify tags in the context of a scene. Identifying scenes manually and then employing AI to identify contextual metadata is a time-intensive and expensive process. Conventional video segmentation engines generate substantial errors while automatically generating logical scene boundaries. For example, these scene detection engines generate abrupt scene boundaries or abrupt cuts, or combine multiple scenes into a single scene, or require a large number of configuration parameters that need to be varied based on an asset type or an asset duration, which makes the configuration parameters non-scalable across media assets.

Some conventional methods employ dynamic programming for scene detection which depends on a precomputed table or a lookup table to configure values of parameters that are utilized in a scene detection algorithm. The precomputed table that is used to configure the values of the parameters limits the dynamic nature of the scene detection algorithm. Other conventional methods employ a video image feature as the only component for clustering which limits the similarity that can be established between two shots. Moreover, in methods that use an audio sample for scene correction, the audio sample that has been classified into a fixed class limits the range of similarity between two shots that can be used to correct a scene. Furthermore, use of hierarchical clustering limits the number of scenes that can be created for a video asset as the number of clusters that can be created must be preselected. The conventional methods, therefore, require various configurable parameters that control the number of scenes in a video asset and vary for each asset, thereby disallowing deployment on scale. Furthermore, these conventional methods do not perform any post clustering correction process to undo errors generated by a clustering algorithm, thereby resulting in scenes containing shots that are not linear in time.

Hence, there is a long-felt need for a system and a method for automatically detecting and marking logical scenes in media content using artificial intelligence, that address the above-recited problems associated with the related art.

OBJECTS OF THE EMBODIMENTS HEREIN

An object of the embodiments herein is to develop a system and a method for automatically detecting and marking logical scenes in media content using Artificial Intelligence (AI).

Another object of the embodiments herein is to use AI to find logical scene boundaries in media content, for example, in a video file.

Yet another object of the embodiments herein is to implement machine learning clustering using affinity propagation, which does not require a parameter such as number of clusters to be created.

Yet another object of the embodiments herein is to perform automatic clustering of media content by executing an affinity propagation clustering algorithm on two dimensions, that is, visual features and audio features.

Yet another object of the embodiments herein is to select the number of scenes for every media asset, for example, video, dynamically based on feature similarity.

Yet another object of the embodiments herein is to perform a noise reduction process prior to the automated clustering of media content to preclude production of a noisy result from the execution of the affinity propagation clustering algorithm.

Yet another object of the embodiments herein is to perform a post processing step, that is, a linear traversal of shots in the media content to correct the scene boundary errors, which aids in removing abrupt cuts generated at a shot level while identifying the scene and re-adjusting the scene boundaries, thereby increasing the accuracy and precision of scene detection by decreasing the number of abrupt scene cuts.

Yet another object of the embodiments herein is to execute a linear traversal algorithm, that is, a scene correction algorithm, using only one parameter, that is, a threshold of the number of shots that need to be similar between the boundaries of two consecutive scenes to be considered as a part of the same scene. If a custom check function for the above-mentioned scenario passes, the linear traversal module merges the abrupt scenes into a single scene.

The objects disclosed above will be realized and achieved at least by the elements, features, and combinations particularly disclosed in the detailed description that follows. The objects disclosed above have outlined, rather broadly, the features of the embodiments herein in order that the detailed description that follows may be better understood. The objects disclosed above are not intended to determine the scope of the claimed subject matter and are not to be construed as limiting of the embodiments herein. Additional objects, features, and advantages of the embodiments herein are disclosed below. The objects disclosed above, which are believed to be characteristic of the embodiments herein, both as to its organization and method of operation, together with further objects, features, and advantages, will be better understood and illustrated by the technical features broadly embodied and described in the following description when considered in connection with the accompanying drawings.

SUMMARY

This summary is provided to introduce a selection of concepts in a simplified form that are further disclosed in the detailed description. This summary is not intended to determine the scope of the claimed subject matter.

The embodiments herein address the above-recited need for a system and a method for automatically detecting and marking logical scenes in media content using Artificial Intelligence (AI). The embodiments herein employ AI to identify logical scene boundaries in media content, for example, in a video file. The system disclosed herein comprises at least one processor and a scene detection engine. The scene detection engine is configured as an AI engine comprising multiple modules defining computer program instructions, which when executed by the processor(s), cause the processor(s) to automatically detect and mark logical scenes in media content using artificial intelligence. The scene detection engine receives an input message comprising media content, for example, video content streamed from a distributed streaming platform such as the Apache Kafka® platform. The scene detection engine detects boundaries of multiple shots in the video content. That is, for each of the shots in the video content, the scene detection engine detects an end point of a shot and a starting point of a consecutive shot. The scene detection engine extracts a middle frame of each of the shots. The scene detection engine generates an image similarity matrix by extracting color features from the middle frame of each of the shots. The scene detection engine also extracts audio content of each of the shots. The scene detection engine generates an audio similarity matrix by extracting audio features from the audio content of each of the shots. The scene detection engine then generates a resultant similarity matrix from the image similarity matrix and the audio similarity matrix. The resultant similarity matrix is a merged similarity matrix, that is, a combination of the image similarity matrix and the audio similarity matrix. In an embodiment, the scene detection engine reduces noise in the resultant similarity matrix to allow insertion of the resultant similarity matrix into the clustering algorithm and generation of an output with reduced or no noise.

The scene detection engine executes a clustering algorithm using the resultant similarity matrix with reduced or no noise. In an embodiment, the scene detection engine executes an affinity propagation clustering algorithm on the resultant similarity matrix. The scene detection engine performs automatic clustering of video content using the affinity propagation clustering algorithm on two dimensions, that is, visual features and audio features. On execution of the clustering algorithm, the scene detection engine generates an ordered sequence of shots that define a boundary of each of the scenes of the video content, thereby automatically detecting and marking logical scenes in the video content. In an embodiment, the scene detection engine executes a post-processing step to remove outliers from the ordered sequence of shots. The scene detection engine executes a linear traversal algorithm on the shots that define the boundary of each of the scenes for correcting errors in the defined boundary of each of the scenes of the video content.

In the embodiments herein, the scene detection engine implements machine learning clustering using affinity propagation, which does not require a parameter such as number of clusters to be created. In the embodiments herein, the scene detection engine selects the number of scenes for every media asset, for example, video, dynamically based on feature similarity. The scene detection engine also performs a post processing step, that is, linear traversal for scene boundary correction which aids in removing abrupt cuts generated at a shot level while identifying the scene, thereby increasing the accuracy of the scene detection engine by decreasing the number of abrupt scene cuts. The linear traversal algorithm requires only one parameter, that is, a threshold of the number of shots that needs to be similar between the boundaries of two consecutive scenes to be considered as a part of the same scene. If a custom check function for the above-mentioned scenario passes, the scene detection engine merges the abrupt scenes into a single scene. The post processing with the linear traversal of shots in the video content performed by the scene detection engine corrects the scene boundary errors, thereby removing abrupt cuts, re-adjusting the scene boundaries, and substantially increasing precision. Furthermore, the scene detection engine detects the scenes in an asset with only one configuration parameter which allows deployment on scale and operates for a wide variety of entertainment assets, for example, movies.

In one or more embodiments, related systems comprise circuitry and/or programming for effecting the embodiments herein. In an embodiment, the circuitry and/or programming are any combination of hardware, software, and/or firmware configured to implement the embodiments herein depending upon the design choices of a system designer. Also, in an embodiment, various structural elements are employed depending on the design choices of the system designer.

BRIEF DESCRIPTION OF THE DRAWINGS

The foregoing summary, as well as the following detailed description, is better understood when read in conjunction with the appended drawings. For illustrating the embodiments herein, exemplary constructions of the embodiments herein are shown in the drawings. However, the embodiments herein is not limited to the specific methods and components disclosed herein. The description of a method step or a component referenced by a numeral in a drawing is applicable to the description of that method step or component shown by that same numeral in any subsequent drawing herein.

FIG. 11 illustrates an exemplary output generated by an execution of a linear traversal algorithm, according to an embodiment herein.

DETAILED DESCRIPTION

Figure 1:
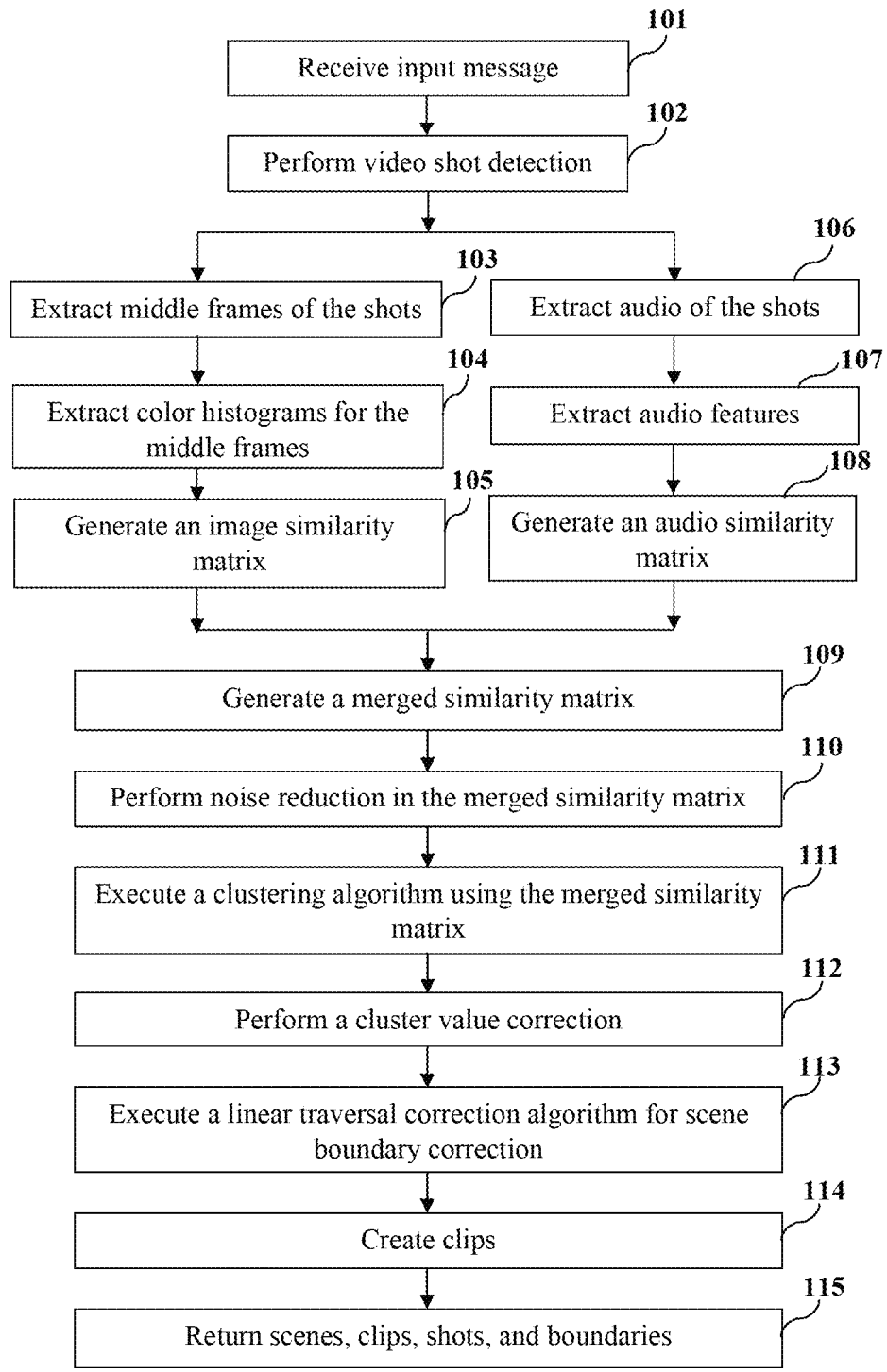
FIG. 1 illustrates a flowchart of a method for automatically detecting and marking logical scenes in media content using artificial intelligence, according to an embodiment herein.
Figure 13:
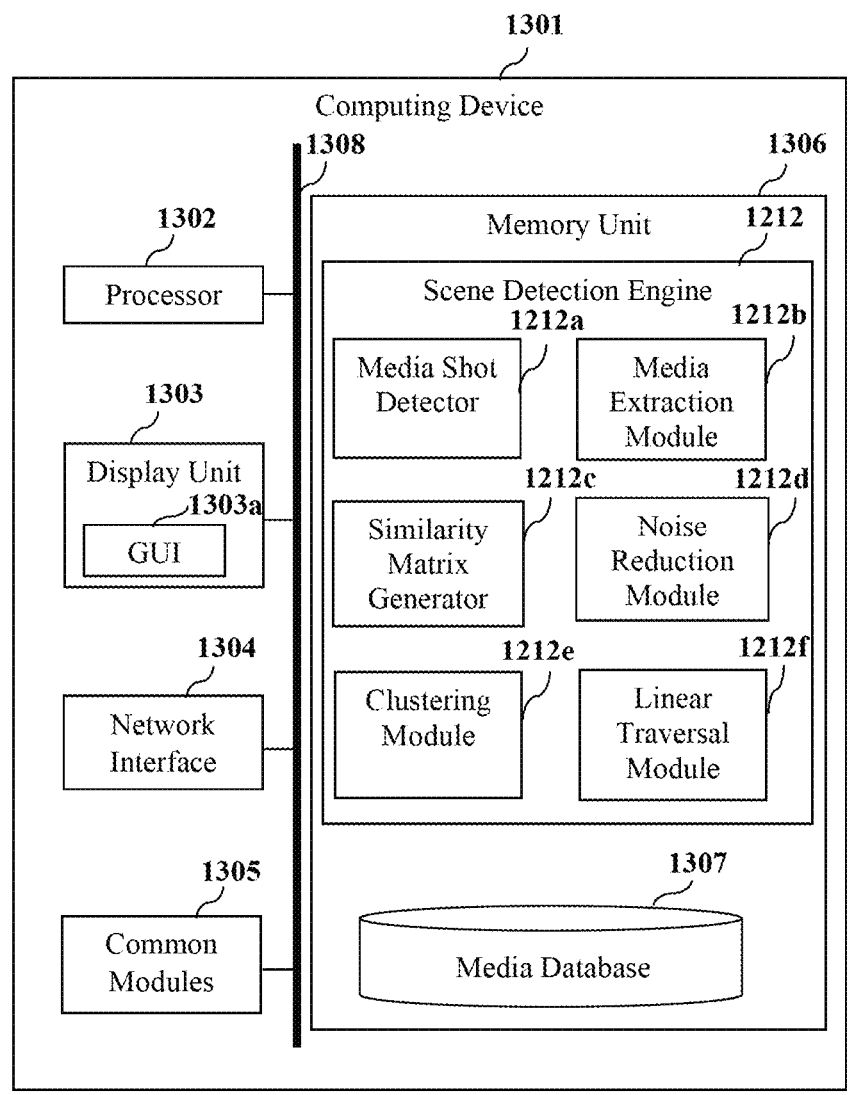
FIG. 13 illustrates an architectural block diagram showing an implementation of the scene detection engine in a computing device for automatically detecting and marking logical scenes in media content using artificial intelligence, according to an embodiment herein.

FIG. 1 illustrates a flowchart of a method for automatically detecting and marking logical scenes in media content using Artificial Intelligence (AI), according to an embodiment herein. As used herein, the term "scene" refers to a sequence of shots that are semantically related and temporally adjacent to each other and represent a concept or a story. The embodiments herein employ AI to identify logical scene in media content, for example, in a video file. The method disclosed herein employs a scene detection engine configured to automatically detect and mark logical scenes in media content. The scene detection engine is configured as an AI engine comprising multiple modules as illustrated in FIG. 13, defining computer program instructions, which when executed by at least one processor, cause the processor(s) to automatically detect and mark logical scenes in media content using AI.

In the method disclosed herein, the scene detection engine receives 101 an input message comprising media content, for example, video content streamed from a distributed streaming platform such as the Apache Kafka® platform. The scene detection engine performs 102 video shot detection by detecting boundaries of multiple shots in the video content. That is, for each of the shots in the video content, the scene detection engine detects an end point of a shot and a starting point of a consecutive shot. The scene detection engine, therefore, establishes when a shot is ending and when a consecutive shot is starting. The scene detection engine extracts 103 a middle frame of each of the shots. The scene detection engine then extracts 104 col or histograms for the middle frames as disclosed in the detailed description of FIG. 5. The scene detection engine generates 105 an image similarity matrix as illustrated in FIG. 6, by extracting color features from the middle frames of the shots. The image similarity matrix defines similarities between image data points.

Figure 8:
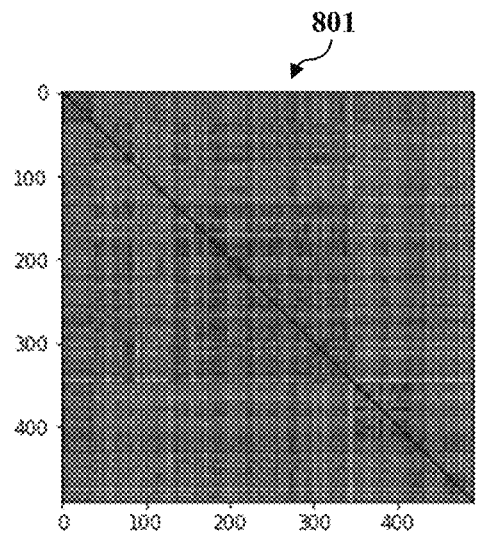
FIG. 8 illustrates an audio similarity matrix, according to an embodiment herein.
Figure 9:
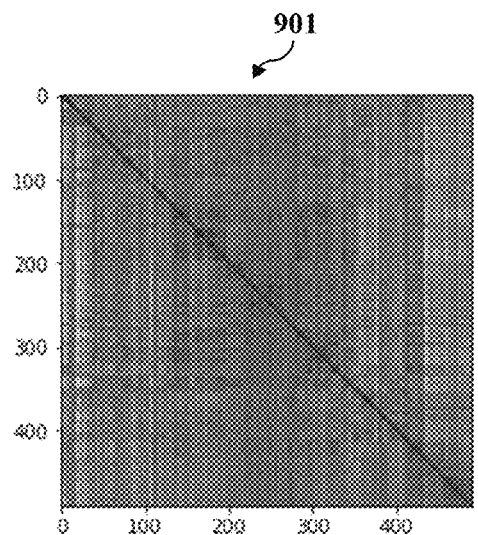
FIG. 9 illustrates a resultant similarity matrix generated from the image similarity matrix and the audio similarity matrix, according to an embodiment herein.
Figure 10:
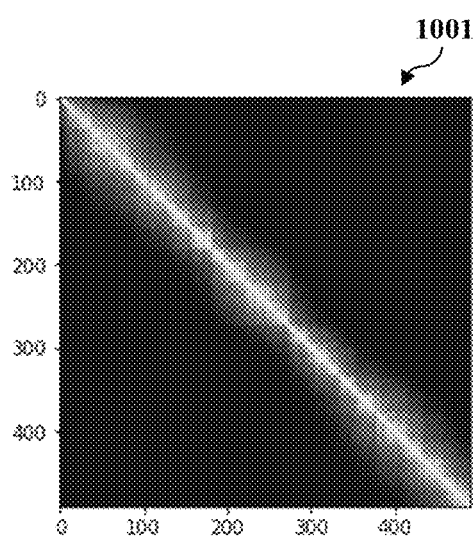
FIG. 10 illustrates an output resultant similarity matrix with reduced noise, according to an embodiment herein.

The scene detection engine also extracts 106 audio content of each of the shots. The scene detection engine extracts 107 audio features from the audio content of each of the shots as disclosed in the detailed description of FIG. 7 and generates 108 an audio similarity matrix as illustrated in FIG. 8. The audio similarity matrix defines similarities between the audio features. The scene detection engine then generates 109 a resultant similarity matrix from the image similarity matrix and the audio similarity matrix as illustrated in FIG. 9. The resultant similarity matrix is a merged similarity matrix, that is, a combination of the image similarity matrix and the audio similarity matrix. The resultant similarity matrix with reduced or no noise is illustrated in FIG. 10. In an embodiment, the scene detection engine performs 110 a noise reduction process to reduce noise in the resultant similarity matrix to allow insertion of the resultant similarity matrix into a clustering algorithm and generation of an output with reduced or no noise.

The scene detection engine executes 111 a clustering algorithm using the resultant similarity matrix with reduced or no noise as an input. In an embodiment, the scene detection engine executes an affinity propagation clustering algorithm on the resultant similarity matrix. The affinity propagation clustering algorithm is a clustering algorithm based on message passing between data points. The affinity propagation clustering algorithm does not require a selection of the number of clusters prior to execution of the clustering algorithm. Affinity propagation determines exemplars or members of the resultant similarity matrix that represent the clusters. The scene detection engine performs automatic clustering of video content using the affinity propagation clustering algorithm on two dimensions, that is, visual features and audio features. On execution of the clustering algorithm, the scene detection engine generates an ordered sequence of shots that define a boundary of each of the scenes of the video content, thereby automatically detecting and marking logical scenes in the video content. In an embodiment, the scene detection engine performs 112 a post-processing step, that is, a cluster value correction step to remove outliers from the clustering results, that is, from the ordered sequence of shots. The scene detection engine performs a scene boundary correction using a linear traversal algorithm for correcting scene boundary errors and reducing abrupt cuts while creating scene boundaries. That is, the scene detection engine executes 113 the linear traversal algorithm on the shots that define the boundary of each of the scenes for correcting errors in the defined boundary of each of the scenes of the video content. The scene detection engine creates 114 clips and returns 115 the scenes, the clips, the shots, and boundaries as output. The scene detection engine, therefore, creates scenes that have a logical sense of continuity between the scenes and that do not have abrupt cuts.

Figure 2:
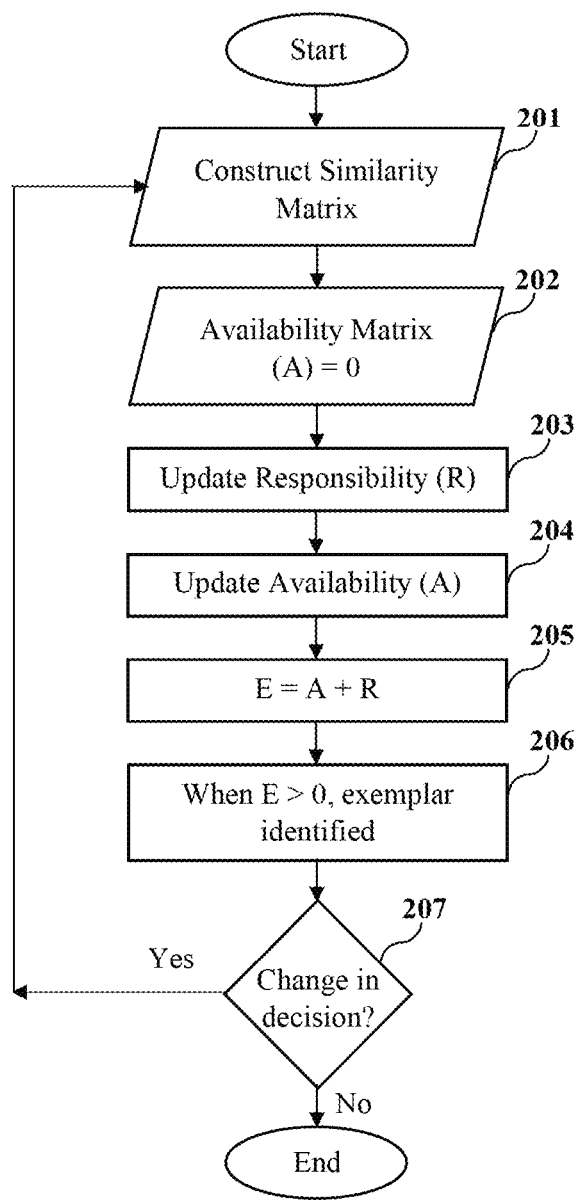
FIG. 2 illustrates a flowchart of a method for executing a clustering algorithm on a resultant similarity matrix generated for automatically detecting and marking logical scenes in media content, according to an embodiment herein.

FIG. 2 illustrates a flowchart of a method for executing a clustering algorithm on a resultant similarity matrix generated for automatically detecting and marking logical scenes in media content, according to an embodiment herein. To generate the resultant similarity matrix, the scene detection engine receives an input of the similarity matrix of the image and audio features of each shot in a video asset, that is, the image similarity matrix and the audio similarity matrix and merges the two matrices. The scene detection engine then determines the mean of both the matrices to create the resultant similarity matrix. In an embodiment, prior to providing the resultant similarity matrix to the clustering algorithm as input, the scene detection engine passes the merged similarity matrix through various cost functions to update the similarity function and to reduce the error in the output during clustering and refine the clustering result. For example, the scene detection engine passes the merged similarity matrix through a distance cost function where a distance cost is added to the resultant similarity matrix as a distance or time difference between two shots is needed for establishing similarity. Two shots that are substantially far apart are not expected to be grouped in the same cluster, that is, in the same scene. The merged similarity matrix that is passed through the distance cost function is herein referred to as an "affinity matrix" or a distance matrix. The scene detection engine converts the affinity matrix to the resultant similarity matrix. The scene detection engine transforms the affinity matrix for which 0 values mean identical elements and high values mean substantially dissimilar elements into the resultant similarity matrix that is suited for the clustering algorithm by applying the Gaussian kernel, for example, the radial basis function (RBF) kernel and/or the heat kernel.

As illustrated in FIG. 2, the scene detection engine constructs 201 the resultant similarity matrix as disclosed above and inputs the resultant similarity matrix to the affinity propagation clustering algorithm. The resultant similarity matrix has a similarity value, $S(i,k)$, between shots in the video asset. The scene detection engine constructs ability matrix (R) represented as $r(i,k)$ that reflects suitability of point "k" to be an exemplar for point "i". The scene detection engine initializes 202 an availability matrix (A) with a zero value as $a(i,k)=0$. The availability matrix $a(i,k)$ reflects suitability of point "i" to select point "k" as its exemplar. The scene detection engine then updates 203 the responsibility matrix (R) as $r(i,k)=s(i,k')-\max\{a(i,k')+s(i,k')\}k'\neq k$. The scene detection engine then updates 204 the availability in the availability matrix (A) as $a(i,k)=\min\{0, r(k,k)+\Sigma_{i':i\notin\{i,k\}} \max\{0,r(i'k)\}\}$, for $k\neq i$. The scene detection engine then sums 205 the availability matrix and the responsibility matrix as $E=A+R$ to monitor an exemplar decision for a particular data point i; $a(i,k)+r(i,k)>0$ for identification of an exemplar. When the scene detection engine determines E is greater than 0, the scene detection engine identifies 206 an exemplar and checks 207 whether there is a change in the exemplar decision. If there is a change in the exemplar decision, the scene detection engine repeats the steps 201 to 206. If there is no change in the exemplar decision, the scene detection engine ends the process.

Figure 3:
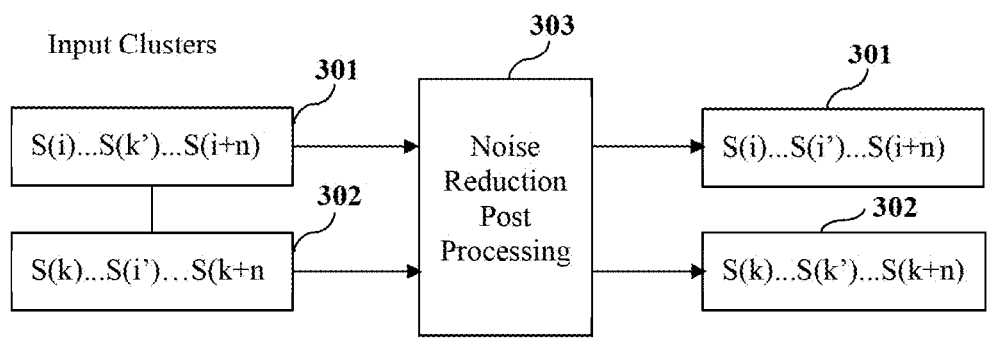
FIG. 3 illustrates a schematic diagram showing a noise reduction process performed after executing the clustering algorithm on the resultant similarity matrix, according to an embodiment herein.

FIG. 3 illustrates a schematic diagram showing a noise reduction process performed after executing the clustering algorithm on the resultant similarity matrix, according to an embodiment herein. The output of the clustering algorithm is mostly ordered and the shots are placed in the correct order, that is, the sequence of shots in a cluster is mostly sequential due to the steps taken to add necessary cost to a similarity value between the shots such that the clustering algorithm creates clusters with ordered shots in each cluster. In some cases, the output of the clustering algorithm comprises some outliers in the ordered sequence of shots in some clusters. Consider an example of an output of the clustering algorithm where cluster C(i) contains the shots S(i) . . . S(k') . . . S(i+n) 301 and another cluster C(i+1) 302 contains the shots S(k) . . . S(i') . . . S(k+n) as illustrated in FIG. 3. In this example, one shot S(k') in the cluster C(i) needs to be placed into the cluster C(i+1), while another shot S(i') in the cluster C(i+1) needs to be placed into the cluster C(i) to maintain a time continuity between the shots in a cluster. In an embodiment, the scene detection engine performs a noise reduction process 303 that reshuffles or sorts the shots based on their shot numbers such that the unordered shots are placed in the correct clusters 301 and 302 as illustrated in FIG. 3. The clustering output comprises multiple clusters, where each cluster represents a scene of a video. The noise reduction process helps in avoiding overlapped scene boundaries and video discontinuity in a scene.

Figure 4:
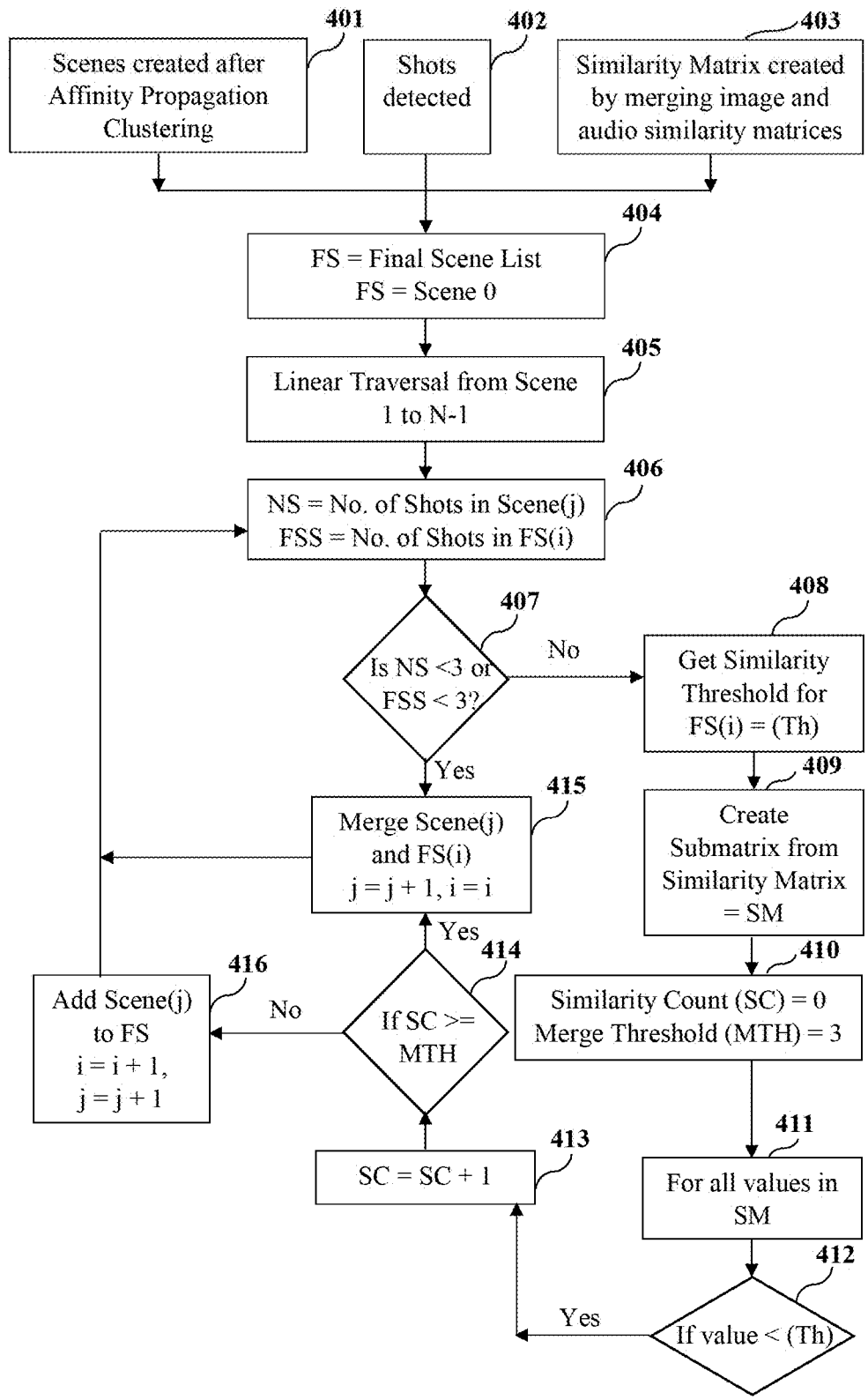
FIG. 4 illustrates a flowchart of a method for correcting errors in boundaries of scenes defined in media content after execution of the clustering algorithm on the resultant similarity matrix, according to an embodiment herein.

FIG. 4 illustrates a flowchart of a method for correcting errors in boundaries of scenes defined in the media content after execution of the clustering algorithm on the resultant similarity matrix, according to an embodiment herein. The linear traversal algorithm uses linear traversal and image and video similarity for correcting errors in the boundaries of the scenes defined in the media content. The scene detection engine receives a list of scenes 401 created from the execution of the affinity propagation clustering algorithm, the shots 402 detected when the media asset was input to the scene detection engine, and the resultant similarity matrix 403 comprising the image similarity matrix and the audio similarity matrix merged together that is generated prior to implementation of the noise reduction process on the resultant similarity matrix, as inputs to the linear traversal algorithm, also referred to as a "scene correction algorithm". The scene detection engine creates a temporary list, namely, a final scene (FS) list, to add new scenes created by the execution of the linear traversal algorithm. The scene detection engine initializes 404 FS as FS=Scene(0), where Scene (0) is the first scene from the input scene list.

The scene detection engine executes a linear traversal 405 from Scene 1 to Scene N−1 and iterates the following steps for Scene 1 to Scene N. The scene detection engine records 406 the number of shots (NS) for the current scene. Scene(j), and the number of shots in the last scene of the final scene list (FSS). The scene detection engine performs 407 a comparison of the number of shots with a predefined number as follows. If the number of shots in the current scene, that is, Scene(j) is less than 3 or if the number of shots in the last scene of the final scene list FSS(i) is less than 3, then the scene detection engine merges 415 the scene with the current processing scene. If the previous check fails, then the scene detection engine obtains 408 a similarity threshold for FS(i), that is, the last scene in the final scene list. As the scene detection engine records the number of shots present in a scene, the scene detection engine extracts a similar size square matrix from the resultant similarity matrix that is received as an input to the linear traversal algorithm. The extracted square matrix is represented as SMFS(i)=[SimilarityMatrix]startshot<i<endshot,startshot<j<endshot. The scene detection engine extracts a similarity threshold of the previous matrix by inserting SMFS(i) to a K-means clustering algorithm with a cluster size as two. At this step, the K-means clustering algorithm buckets the values of the matrix into two buckets to determine the range of values that represent the similarity between shots in the current scene. After the clusters are created, the first value of the buckets with larger values represents the threshold value (Th). The scene detection engine creates 409 a submatrix (SM) from the last three shots of the last scene of the final scene list FS(i) and the first three shots of the current scene, Scene(j). For all values in the submatrix 411, the scene detection engine compares 412 each similarity value with the threshold value. The threshold value acts as a pivot value as any similarity value less than the threshold value indicates the similarity value being in the range of similarity values between shots in the current scene. If the similarity value is less than the threshold value, the scene detection engine increments 413 the similarity count (SC) by 1 and proceeds to step 414 disclosed below. The similarity count indicates the number of shots that have a similarity value less than the threshold value. The threshold value allows determination of whether the similarity value between shots of the next scene with the current scene is in the range of values held by similar shots in the current scene.

The scene detection engine configures 410 a merge threshold (MTH) for determining whether two scenes should be merged based on the count of the number of shots with a similarity value less than the threshold value. The scene detection engine determines 414 whether the similarity count is greater than the merge threshold. If the similarity count is greater than the merge threshold, the scene detection engine merges 415 the two scenes or in an embodiment, the scene detection engine joins the two scenes and updates the end time of the previous scene to the end time of the current scene. The submatrix created for this step is a part of the resultant similarity matrix provided as an input to the linear traversal algorithm. If the current scene does not pass the merge threshold check, that is, the check of whether the similarity count is less than the merge threshold, then the scene detection engine takes the current scene as an independent scene and adds 416 the current scene to the final scene list. If the check passes, the scene detection engine modifies the last scene of the final scene list to merge 415 with the current scene. The scene detection engine, therefore, compares shots around the boundary of the scene to determine the validity of the scene and classify whether a cut is abrupt or correct. The last three shots on the boundary of the cut provides substantial information about the temporal character of the consecutive scene and hence are used to establish similarity between scenes.

Consider an example of the method for automatically detecting and marking logical scenes in media content, for example, a video asset, according to an embodiment herein. The scene detection engine receives an input message from a distributed streaming platform such as the Apache Kafka® platform. The input message comprises a download path of the video asset. The scene detection engine extracts a shot boundary contained in the video asset and creates shot video files as exemplarily disclosed below:

Shot Number 0 Start Time 00:00:00.000 End Time 00:00:05.042

Shot Number 1 Start Time 00:00:05.042 End Time 00:00:09.208

Shot Number 2 Start Time 00:00:09.208 End Time 00:00:30.042

Shot Number 3 Start Time 00:00:30.042 End Time 00:00:40.500

Shot Number 4 Start Time 00:00:40.500 End Time 00:00:44.708

Shot Number 489 Start Time 00:29:39.583 End Time 00:30:00.000

Figure 5:
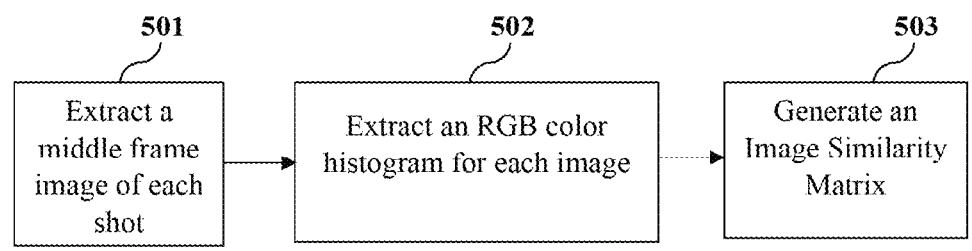
FIG. 5 illustrates a flow diagram of method for generating an image similarity matrix, according to an embodiment herein.
Figure 6:
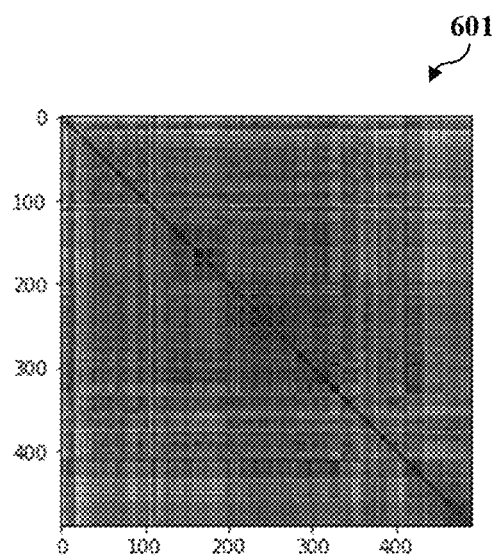
FIG. 6 illustrates an image similarity matrix, according to an embodiment herein.

The scene detection engine then proceeds to generate an image similarity matrix as illustrated in FIG. 5. FIG. 5 illustrates a flow diagram of method for generating the image similarity matrix, according to an embodiment herein. The scene detection extracts 501 a middle frame image of each of the shots disclosed above and stores the middle frame in a path. The scene detection engine extracts 502 a red, green, blue (RGB) color histogram for the middle frame of each of the shots. The scene detection engine extracts the color histogram for an RGB image with eight buckets for each channel. The length of the color histogram feature vector is 512 for each image. The scene detection engine then generates 503 the image similarity matrix 601 as illustrated in FIG. 6.

Figure 7:
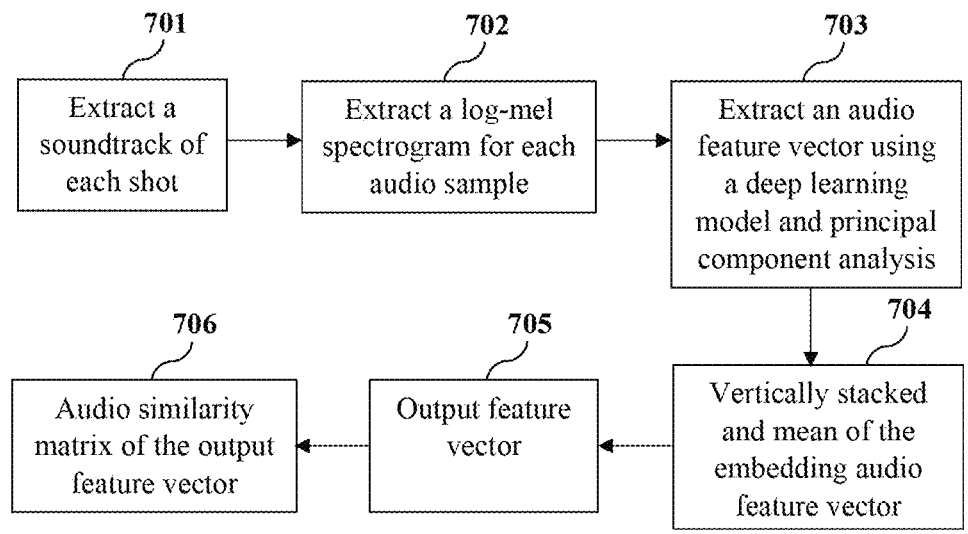
FIG. 7 illustrates a flow diagram of method for generating an audio similarity matrix, according to an embodiment herein.

The scene detection engine then proceeds to generate an audio similarity matrix as illustrated in FIG. 7. FIG. 7 illustrates a flow diagram of method for generating the audio similarity matrix, according to an embodiment herein. The scene detection engine extracts 701 audio content, for example, a soundtrack, of each of the shots. The scene detection engine extracts an audio feature vector for each extracted soundtrack. In an embodiment, the scene detection engine implements a deep learning model for classifying audio samples into various classes. The scene detection engine extracts 702 a log-mel spectrogram for each audio file and provides the log-mel spectrogram as an input to an input layer of the deep learning model. The scene detection engine extracts 703 an audio feature vector using the deep learning model and principal component analysis (PCA). The output of the penultimate layer, that is, the embedding layer of the deep learning model is provided as an input to a PCA module. The PCA module performs principal component analysis to reduce the size of the input audio feature vector and provides an embedding audio feature vector of shape (audioSeconds, 128). The scene detection engine vertically stacks 704 this embedding audio feature vector and then computes a mean of the stack to generate 705 an output feature vector of shape (128,) for each audio input. The scene detection engine then generates 706 the audio similarity matrix 801 as illustrated in FIG. 8. The scene detection engine further generates a resultant similarity matrix 901 as illustrated in FIG. 9, by merging the image similarity matrix and the audio similarity matrix. The scene detection engine merges the image similarity matrix and the audio similarity matrix by vertically stacking the image similarity matrix and the audio similarity matrix and computing a mean of the stack. The scene detection engine then performs a noise reduction process on the resultant similarity matrix by applying a distance cost function and a kernel function to the resultant similarity matrix, thereby converting the distance matrix to an output resultant similarity matrix 1001 with reduced noise as illustrated in FIG. 10.

The scene detection engine inputs this output resultant similarity matrix with reduced noise to the clustering algorithm, for example, the affinity propagation clustering algorithm. On executing the affinity propagation clustering algorithm, the scene detection engine generates the following exemplary output: Clustering labels [0 0 0 0 0 0 0 0 1 1 1 1 1 1 1 1 1 1 1 2 2 2 2 2 2 2 2 2 2 2 2 2 2 3 3 3 3 3 3 3 3 3 3 3 3 3 4 4 4 4 4 4 4 4 4 4 4 4 5 5 5 5 5 5 5 5 5 5 5 5 5 5 5 5 5 6 6 6 6 6 6 6 6 6 6 6 7 7 7 7 7 7 7 7 7 7 7 7 7 8 8 8 8 8 8 8 8 8 8 8 8 9 9 9 9 9 9 9 9 9 9 10 10 10 10 10 10 10 10 10 10 10 10 10 10 10 11 11 11 11 11 11 11 11 11 11 11 12 12 12 11 12 12 12 12 12 12 12 12 12 12 12 12 12 13 13 13 13 13 13 13 13 13 13 13 13 13 13 13 14 14 14 14 14 14 14 14 14 14 14 15 15 15 15 15 15 15 15 15 15 15 15 15 15 16 16 16 16 16 16 16 16 16 16 16 16 16 16 16 16 16 17 17 17 17 17 17 17 17 17 17 17 17 17 17 17 18 18 18 18 18 18 18 18 18 18 18 18 18 18 18 18 19 19 19 19 19 19 19 19 19 19 20 20 20 20 20 20 20 20 20 20 20 20 20 21 21 21 21 21 21 21 21 22 22 22 22 22 22 22 22 22 22 22 22 22 22 22 22 22 23 23 23 23 23 23 23 23 23 23 23 23 24 24 24 24 24 24 24 24 24 24 24 24 24 24 24 24 24 25 25 25 25 25 25 25 25 25 25 25 25 25 26 26 26 26 26 26 26 26 26 26 26 26 26 26 26 26 27 27 27 27 27 27 27 27 27 27 27 27 27 27 27 28 28 28 28 28 28 28 28 28 28 28 28 28 28 28 28 28 28 29 29 29 29 29 29 29 29 29 29 29 29 29 29 29 29 29 30 30 30 30 30 30 30 30 30 30 30 30 30 30 30 31 31 31 31 31 31 31 31 31 31 31 31 31 31 32 32 32 32 32 32 32 32 32 32 32 32 32 33 33 33 33 33 33 33 33 33 33 33 33 33 33 33 33 33 33 33 33 33 33 33 33]

The clustering labels disclosed above denote the scene number assigned to each shot in the list. As illustrated above, the scene number of the consecutive shots is the same denoting that the clustering algorithm has identified that the consecutive shots are similar to each other. Furthermore, as illustrated in the example above, there are 34 unique labels in the output above and therefore the output number of the scene for the video asset is 34.

Figure 11:
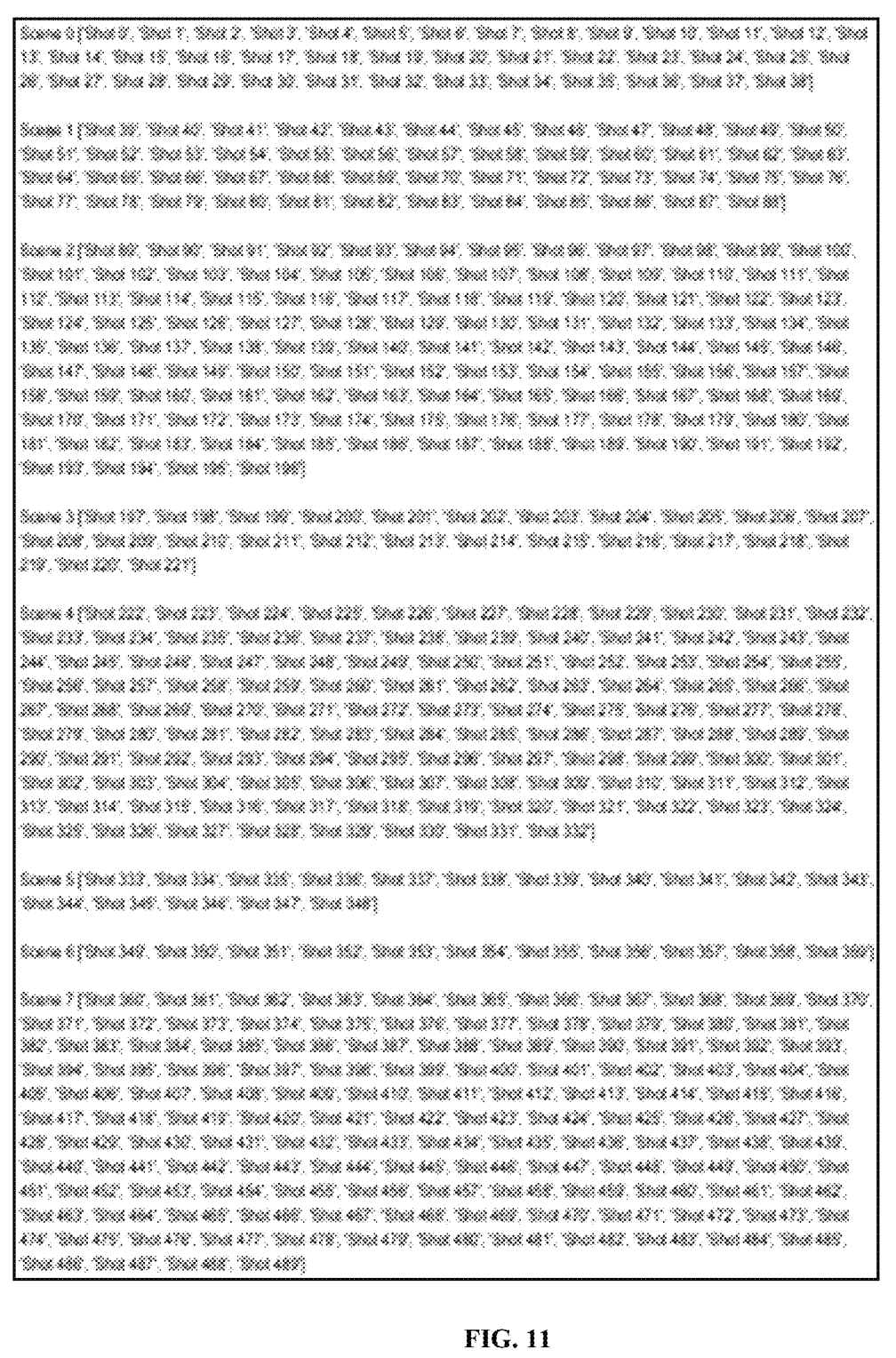

In an embodiment, the scene detection engine performs a noise reduction process or a cluster value correction process following the execution of the clustering algorithm if there are consecutive shots that have been assigned scene labels that are not following the order of the scene label. For example, if some consecutive shots with a scene label 28 are followed by consecutive shots with a scene label 30 and then shots with a scene label 29, the scene detection engine performs the noise reduction process. The noise reduction process performed by the scene detection engine rectifies the error in the above allocation such that the assignment of the scene number is consecutive for each shot in the same order. The scene detection engine then executes the linear traversal algorithm for correcting the scene and merging two similar scenes to reduce abrupt cuts. The output of the linear traversal algorithm generates the output exemplarily illustrated in FIG. 11, for the above input clusters.

The output of the linear traversal algorithm reduces the scene count from 34 to 8 as the linear traversal algorithm successfully established the similarity between consecutive scenes. The scene detection engine creates clips as shots combined together, that are just greater than 6 seconds. The scene detection engine combines consecutive shots together until the consecutive shots are greater than 6 seconds and then converts the combined consecutive shots into a clip. The scene detection engine encapsulates time boundaries of the clip under the shots that the clip contains. The final truncated output of the scene detection engine is the scenes, the shots, and the clips as exemplarily disclosed below.

Scenes [{'start_time': 0.0, 'end_time': 202.33333333333334, 'start_frame': 0, 'end_frame': 4856, 'description':''}, {'start_time': 202.33333333333334, 'end time': 318.2916666666667, 'start_frame': 4856, 'end_frame': 7639, 'description':''}, {'start_time': 318.2916666666667, 'end_time': 728.5833333333334, 'start_frame': 7639, 'end_frame': 17486, 'description': ''}, {'start_time': 728.5833333333334, 'end_time': 804.6666666666666, 'start_frame': 17486, 'end_frame': 19312, 'description':''), {'start_time': 804.6666666666666, 'end_time': 1271.5833333333333, 'start_frame': 19312, 'end_frame': 30518, 'description': ''}, {'start_time': 1271.5833333333333, 'end_time': 1337.4583333333333, 'start_frame': 30518, 'end_frame': 32099,'description':''}, {'start_time': 1337.4583333333333, 'end_time': 1393.8333333333333, 'start_frame': 32099, 'end_frame': 33452, 'description':''}, {'start_time': 1393.8333333333333, 'end_time': 1800.0, 'start_frame': 33452, 'end_frame': 43200, 'description':''}]Shots [{'start_time': 0.0, 'end_time': 5.041666666666667, 'start_frame': 0. 'end_frame': 121, 'description':''). {'start_time': 5.041666666666667, 'end_time': 9.208333333333334, 'start_frame': 121, 'end_frame': 221. 'description': ''}, {'start_time': 9.208333333333334, 'end_time': 30.041666666666668, 'start_frame': 221, 'end_frame': 721, 'description':''}, {'start_time': 30.041666666666668, 'end_time': 40.5, 'start_frame': 721, 'end_frame': 972, 'description':''), {'start_time': 40.5, 'end_time': 44.708333333333336, 'start_frame': 972, 'end_frame': 1073, 'description':''}] . . . [{'start_time': 1766.2083333333333, 'end_time': 1772.4166666666667, 'start_frame': 42389, 'end_frame': 42538, 'description':''), {'start_time': 1772.4166666666667. 'end_time': 1776.2083333333333, 'start_frame': 42538, 'end_frame': 42629, 'description':''}, {'start_time': 1776.2083333333333, 'end time': 1777.9583333333333, 'start_frame': 42629, 'end_frame': 42671, 'description':''}, {'start_time': 1777.9583333333333, 'end_time': 1779.5833333333333, 'start_frame': 42671, 'end_frame': 42710, 'description':''}, {'start_time': 1779.5833333333333, 'end time': 1800.0, 'start_frame': 42710, 'end_frame': 43200, 'description':''}]Clips [{'start_time': 0.0, 'end_time': 9.208333333333334, 'start_frame': 0, 'end_frame': 221, 'description':''}, {'start_time': 9.208333333333334, 'end_time': 30.041666666666668, 'start_frame': 221, 'end_frame': 721, 'description':''}, {'start_time': 30.041666666666668, 'end_time': 40.5, 'start_frame': 721, 'end_frame': 972, 'description':''}, {'start_time': 40.5, 'end time': 49.916666666666664, 'start_frame': 972, 'end_frame': 1198, 'description': ''}, {'start_time': 49.916666666666664, 'end_time': 69.125, 'start_frame': 1198, 'end_frame': 1659, 'description': ''}] . . . [{'start_time': 1750.625, 'end_time': 1757.1666666666667, 'start_frame': 42015, 'end_frame': 42172, 'description':''), {'start_time': 1757.1666666666667, 'end_time': 1763.2916666666667, 'start_frame': 42172, 'end_frame': 42319, 'description':''}, {'start_time': 1763.2916666666667, 'end_time': 1772.4166666666667, 'start_frame': 42319, 'end_frame': 42538, 'description':''), {'start_time':

1772.4166666666667, 'end_time': 1779.5833333333333, 'start_frame': 42538. 'end_frame': 42710, 'description':"), {'start_time': 1779.5833333333333, 'end_time': 1800.0, 'start_frame': 42710. 'end_frame': 43200. 'description':"}]

Figure 12:
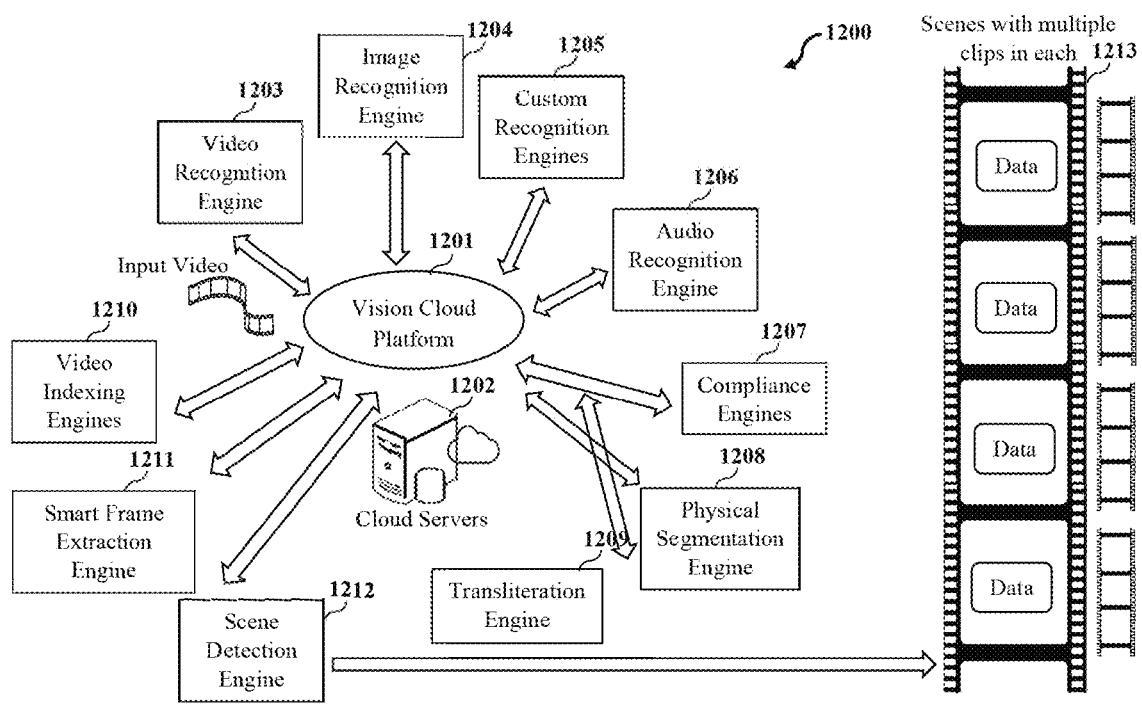
FIG. 12 illustrates a high-level functional block diagram of a system comprising a scene detection engine for automatically detecting and marking logical scenes in media content using artificial intelligence, according to an embodiment herein.

FIG. 12 illustrates a high-level functional block diagram of a system 1200 comprising the scene detection engine 1212 for automatically detecting and marking logical scenes in media content using Artificial Intelligence (AI), according to an embodiment herein. The system 1200 illustrated in FIG. 12 depicts an overall ecosystem comprising functional architecture and video processing architecture that incorporates the scene detection engine 1212. In an exemplary implementation, the functional architecture comprises a vision cloud platform 1201 in operable communication with microservice engines located inside and/or outside the vision cloud platform 1201. In an embodiment, the vision cloud platform 1201 is hosted on cloud servers 1202 in a cloud computing environment. As used herein, "cloud computing environment" refers to a processing environment comprising configurable computing physical and logical resources, for example, networks, servers, storage media, virtual machines, applications, services, etc., and data distributed over a network, for example, the internet. The cloud computing environment provides an on-demand network access to a shared pool of the configurable computing physical and logical resources.

In addition to the scene detection engine 1212, the microservice engines comprise, for example, a video recognition engine 1203, an image recognition engine 1204, custom recognition engines 1205, an audio recognition engine 1206, compliance engines 1207, a physical segmentation engine 1208, a transliteration engine 1209, video indexing engines 1210, a smart frame extraction engine 1211, etc. The vision cloud platform 1201 receives an input video from a distributed streaming platform such as the Apache Kafka® platform. The microservice engines process the input video in accordance with their respective functions. The microservice engines are hosted in private cloud or third-party public cloud services. Similar to the scene detection engine 1212, in an embodiment, the other microservice engines are also configured as AI engines that can be hosted on graphics processing unit (GPU) servers. In an embodiment, the system 1200 disclosed herein implements video processing in a microservice hub, for example, a global electronic commerce (GEC) hub. In an embodiment, there can be combinations of the order in which the scene detection engine 1212 is called, for example, in parallel or serial combinations. In an embodiment, the scene detection engine 1212 is invoked standalone without other microservice engines or in combination with the other microservice engines. The scene detection engine 1212 performs automatic detection and marking of logical scenes separate from or in combination with video processing functions, for example, transliteration, summarization, transcription, content moderation, image analysis, image captioning, implementation of thumbnails, video indexing, transcoding, etc., executed by the other microservice engines.

In the system 1200 disclosed herein, the scene detection engine 1212 processes the input video for automatically detecting and marking logical scenes in the input video using artificial intelligence as disclosed in the detailed descriptions of FIGS. 1-11. In an embodiment, the scene detection engine 1212 probabilistically filters for noise and maps metadata discoveries. In another embodiment, the scene detection engine 1212 communicates with or incorporates scene and recognition engines for generating contextual buckets for data maps and ensuring visual and auditory cohesiveness with respect to time and relevance. The output of the scene detection engine 1212 comprises scenes 1213, each comprising multiple clips and description maps as illustrated in FIG. 12.

FIG. 13 illustrates an architectural block diagram showing an implementation of the scene detection engine 1212 in a computing device 1301 for automatically detecting and marking logical scenes in media content using artificial intelligence, according to an embodiment herein. The computing device 1301 is an electronic device, for example, one or more of a personal computer, a tablet computing device, a mobile computer, a smart phone, a portable computing device, a laptop, a wearable computing device such as smart glasses, smart watches, etc., a touch centric device, a workstation, a server, a client device, a portable electronic device, a network enabled computing device, an interactive network enabled communication device, a gaming device, a television, an image capture device, a web browser, a portable media player, a video recorder, an audio recorder, a theater system, any entertainment system, any other suitable computing equipment or combinations of multiple pieces of computing equipment.

Various aspects of the embodiments herein may be embodied as a system, a method, or a non-transitory, computer-readable storage medium having one or more computer-readable program codes stored thereon. Accordingly, various embodiments herein may take the form of an entirely hardware embodiment, an entirely software embodiment comprising, for example, microcode, firmware, software, etc., or an embodiment combining software and hardware aspects that may be referred to herein as a "system", a "module", an "engine", a "circuit", or a "unit". As used herein, "non-transitory, computer-readable storage medium" refers to all computer-readable media that contains and stores computer programs and data, except for a transitory, propagating signal. Examples of the computer-readable media comprise hard drives, solid state drives, optical discs or magnetic disks, memory chips, a read-only memory (ROM), a register memory, a processor cache, a random-access memory (RAM), etc.

In an embodiment, the scene detection engine 1212 is implemented using programmed and purposeful hardware of the computing device 1301. In an embodiment, the scene detection engine 1212 is accessible to users, for example, through a broad spectrum of technologies and user devices such as smart phones, tablet computing devices, endpoint devices, etc., with access to a network, for example, a short-range network or a long-range network. The network is, for example, one of the internet, an intranet, a wired network, a wireless network, a communication network that implements Bluetooth® of Bluetooth Sig, Inc., a network that implements Wi-Fie of Wi-Fi Alliance Corporation, an ultra-wideband (UWB) communication network, a wireless universal serial bus (USB) communication network, a communication network that implements ZigBee® of ZigBee Alliance Corporation, a general packet radio service (GPRS) network, a mobile telecommunication network such as a global system for mobile (GSM) communications network, a code division multiple access (CDMA) network, a third generation (3G) mobile communication network, a fourth generation (4G) mobile communication network, a fifth generation (5G) mobile communication network, a long-term evolution (LTE) mobile communication network, a public telephone network, etc., a local area network, a wide area network, an internet connection network, an infrared communication network, etc., or a network formed from any combination of these networks.

As illustrated in FIG. 13, the computing device 1301 comprises at least one processor 1302 and a non-transitory, computer-readable storage medium, for example, a memory unit 1306 for storing computer program instructions defined by the modules, for example, 1212a, 1212b, 1212c, 1212d, 1212e, and 1212f of the scene detection engine 1212. The memory unit 1306 is used for storing program instructions, applications, and data. The memory unit 1306 is, for example, a random-access memory (RAM) or another type of dynamic storage device that stores information and instructions for execution by the processor 1302. The memory unit 1306 also stores temporary variables and other intermediate information used during execution of the instructions by the processor 1302. The computing device 1301 further comprises read only memories (ROMs) or other types of static storage devices that store static information and instructions for execution by the processor 1302. In an embodiment, the modules, for example, 1212a, 1212b, 1212c, 1212d, 1212e, and 1212f of the scene detection engine 1212 are stored in the memory unit 1306 as illustrated in FIG. 13.

The processor 1302 is operably and communicatively coupled to the memory unit 1306 for executing the computer program instructions defined by the modules, for example, 1212a, 1212b, 1212c. 1212d, 1212e, and 1212f of the scene detection engine 1212. The processor 1302 refers to any one or more microprocessors, central processing unit (CPU) devices, finite state machines, computers, microcontrollers, digital signal processors, logic, a logic device, an application specific integrated circuit (ASIC), a field-programmable gate array (FPGA), a chip, etc., or any combination thereof, capable of executing computer programs or a series of commands, instructions, or state transitions. In an embodiment, the processor 1302 is implemented as a processor set comprising, for example, a programmed microprocessor and a math or graphics co-processor. The scene detection engine 1212 is not limited to employing the processor 1302. In an embodiment, the scene detection engine 1212 employs controllers or microcontrollers.

As illustrated in FIG. 13, the computing device 1301 further comprises a data bus 1308, a display unit 1303, a network interface 1304, and common modules 1305. The data bus 1308 permits communications between the modules, for example, 1302, 1303, 1304, 1305, and 1306. The display unit 1303, via a graphical user interface (GUI) 1303a, displays information, display interfaces, media content, user interface elements such as checkboxes, input text fields, etc., for example, for allowing a user such as a system administrator to invoke and execute the scene detection engine 1212. The GUI 1303a comprises, for example, online web interfaces, web-based downloadable application interfaces, mobile-based downloadable application interfaces, etc.

The network interface 1304 enables connection of the scene detection engine 1212 to the network. In an embodiment, the network interface 1304 is provided as an interface card also referred to as a line card. The network interface 1304 is, for example, one or more of infrared interfaces, interfaces implementing Wi-Fi® of Wi-Fi Alliance Corporation, universal serial bus interfaces, FireWire® interfaces of Apple Inc., Ethernet interfaces, frame relay interfaces, cable interfaces, digital subscriber line interfaces, token ring interfaces, peripheral controller interconnect interfaces, local area network interfaces, wide area network interfaces, interfaces using serial protocols, interfaces using parallel protocols, Ethernet communication interfaces, asynchronous transfer mode interfaces, high speed serial interfaces, fiber distributed data interfaces, interfaces based on transmission control protocol/internet protocol, interfaces based on wireless communications technology such as satellite technology, radio frequency technology, near field communication, etc. The common modules 1305 of the computing device 1301 comprise, for example, input/output (I/O) controllers, input devices, output devices, fixed media drives such as hard drives, removable media drives for receiving removable media, etc. Computer applications and programs are used for operating the scene detection engine 1212. The programs are loaded onto fixed media drives and into the memory unit 1306 via the removable media drives. In an embodiment, the computer applications and programs are loaded into the memory unit 1306 directly via the network.

The scene detection engine 1212 is configured as an AI engine comprising multiple modules defining computer program instructions, which when executed by the processor 1302, cause the processor 1302 to automatically detect and mark logical scenes in media content using artificial intelligence. The modules of the scene detection engine 1212 comprise a media shot detector 1212a, a media extraction module 1212b, a similarity matrix generator 1212c, a noise reduction module 1212d, a clustering module 1212e, and a linear traversal module 1212f. The media shot detector 1212a receives an input message comprising media content, for example, video content streamed from a distributed streaming platform such as the Apache Kafka® platform. The media shot detector 1212a stores the media content in a media database 1307. The media shot detector 1212a detects boundaries of multiple shots in the video content. That is, for each of the shots in the video content, the media shot detector 1212a detects an end point of a shot and a starting point of a consecutive shot. The media extraction module 1212b extracts a middle frame of each of the shots. The similarity matrix generator 1212c generates an image similarity matrix by extracting color features from the middle frame of each of the shots. The media extraction module 1212b also extracts audio content of each of the shots. The similarity matrix generator 1212c generates an audio similarity matrix by extracting audio features from the audio content of each of the shots. The similarity matrix generator 1212c then generates a resultant similarity matrix from the image similarity matrix and the audio similarity matrix. The resultant similarity matrix is a merged similarity matrix, that is, a combination of the image similarity matrix and the audio similarity matrix. The noise reduction module 1212d reduces noise in the resultant similarity matrix to allow insertion of the resultant similarity matrix into the clustering module 1212e and generation of an output with reduced or no noise.

The clustering module 1212e receives the resultant similarity matrix with reduced or no noise as input from the similarity matrix generator 1212c and executes a clustering algorithm using the resultant similarity matrix. In an embodiment, the clustering module 1212e executes an affinity propagation clustering algorithm on the resultant similarity matrix. The clustering module 1212e performs automatic clustering of video content using the affinity propagation clustering algorithm on two dimensions, that is, visual features and audio features. On execution of the clustering algorithm, the clustering module 1212e generates an ordered sequence of shots that define a boundary of each of the scenes of the video content, thereby automatically detecting and marking logical scenes in the video content. In an embodiment, the clustering module 1212e executes a post-processing step to remove outliers from the ordered sequence of shots. The linear traversal module 1212f executes a linear traversal algorithm on the shots that define the boundary of each of the scenes for correcting errors in the defined boundary of each of the scenes of the video content.

The media shot detector 1212a, the media extraction module 1212b, the similarity matrix generator 1212c, the noise reduction module 1212d, the clustering module 1212e, and the linear traversal module 1212f are disclosed above as software executed by the processor 1302. In an embodiment, the modules, for example, 1212a, 1212b, 1212c, 1212d. 1212e, and 1212f of the scene detection engine 1212 are implemented completely in hardware. In another embodiment, the modules, for example, 1212a, 1212b, 1212c, 1212d. 1212e, and 1212f of the scene detection engine 1212 are implemented by logic circuits to carry out their respective functions disclosed above. In another embodiment, the scene detection engine 1212 is also implemented as a combination of hardware and software including one or more processors, for example, 1302, that are used to implement the modules, for example, 1212a, 1212b, 1212c, 1212d, 1212e, and 1212f of the scene detection engine 1212. The processor 1302 retrieves instructions defined by the media shot detector 1212a, the media extraction module 1212b, the similarity matrix generator 1212c, the noise reduction module 1212d, the clustering module 1212e, and the linear traversal module 1212f from the memory unit 1306 for performing respective functions disclosed above.

For purposes of illustration, the detailed description refers to the modules, for example, 1212a, 1212b, 1212c, 1212d, 1212e, and 1212f of the scene detection engine 1212 being run locally on a single computer system; however the scope of the method and the system disclosed herein is not limited to the modules, for example, 1212a, 1212b, 1212c, 1212d, 1212e, and 1212f of the scene detection engine 1212 being run locally on a single computer system via the operating system and the processor 1302, but may be extended to run remotely over the network by employing a web browser and a remote server, a mobile phone, or other electronic devices. In an embodiment, one or more portions of the system disclosed herein are distributed across one or more computer systems (not shown) coupled to the network.

The non-transitory, computer-readable storage medium disclosed herein stores computer program instructions executable by the processor 1302 for automatically detecting and marking logical scenes in media content using artificial intelligence. The computer program instructions implement the processes of various embodiments disclosed above and perform additional steps that may be required and contemplated for automatically detecting and marking logical scenes in media content using artificial intelligence. When the computer program instructions are executed by the processor 1302, the computer program instructions cause the processor 1302 to perform the steps of the method for automatically detecting and marking logical scenes in media content using artificial intelligence as disclosed above. In an embodiment, a single piece of computer program code comprising computer program instructions performs one or more steps of the method disclosed above. The processor 1302 retrieves these computer program instructions and executes them.

A module, or an engine, or a unit, as used herein, refers to any combination of hardware, software, and/or firmware. As an example, a module, or an engine, or a unit may include hardware, such as a microcontroller, associated with a non-transitory, computer-readable storage medium to store computer program codes adapted to be executed by the microcontroller. Therefore, references to a module, or an engine, or a unit, in an embodiment, refer to the hardware that is specifically configured to recognize and/or execute the computer program codes to be held on a non-transitory, computer-readable storage medium. The computer program codes comprising computer readable and executable instructions can be implemented in any programming language. In an embodiment, the computer program codes or software programs are stored on or in one or more mediums as object code. In another embodiment, the term "module" or "engine" or "unit" refers to the combination of the microcontroller and the non-transitory, computer-readable storage medium. Often module or engine or unit boundaries that are illustrated as separate commonly vary and potentially overlap. For example, a module or an engine or a unit may share hardware, software, firmware, or a combination thereof, while potentially retaining some independent hardware, software, or firmware. In various embodiments, a module or an engine or a unit includes any suitable logic.

The foregoing examples and illustrative implementations of various embodiments have been provided merely for explanation and are in no way to be construed as limiting of the embodiments herein. While the embodiments herein has been described with reference to various embodiments, it is understood that the words, which have been used herein, are words of description and illustration, rather than words of limitation. Further, although the embodiments herein have been described herein with reference to particular means, materials, and embodiments, the embodiments herein is not intended to be limited to the particulars disclosed herein; rather, the embodiments herein extends to all functionally equivalent structures, methods and uses, such as are within the scope of the appended claims. It will be understood by those skilled in the art, having the benefit of the teachings of this specification, that the embodiments herein are capable of modifications and other embodiments may be effected and changes may be made thereto, without departing from the scope and spirit of the embodiments herein.

What is claimed is:

1. A system for automatically detecting and marking logical scenes in media content, the system comprising:
   at least one processor;
   a non-transitory, computer-readable storage medium operably and communicatively coupled to the at least one processor and configured to store the media content and computer program instructions executable by the at least one processor; and
   a key detection engine configured to define the computer program instructions, wherein the computer program instructions executed by the at least one processor to cause the at least one processor to:
   extract a middle frame of each of a plurality of shorts, wherein the plurality of shorts are accessed from the media content;
   extract multiple color features from the middle frame to generate an image similarity matrix;
   extract multiple audio features from audio content of each of the plurality of shots to generate an audio similarity matrix, wherein the generation of an audio similarity matrix comprises extracting an audio feature vector using a deep learning model and performing a principal component analysis to reduce the size of the input audio feature vector and to provide an embedding audio feature vector;
   generate a resultant similarity matrix based on the image similarity matrix and the audio similarity matrix; and
   reduce noise in the resultant similarity matrix by applying a distance cost function and a kernel function to the resultant similarity matrix, thereby converting a distance matrix to an output resultant similarity matrix with a reduced noise.

2. The system of claim 1, wherein the resultant similarity matrix is a combination of the image similarity matrix and the audio similarity matrix.

3. The system of claim 2, wherein the computer program instructions further cause the at least one processor to generate a sequence of the plurality of shots based on the output, wherein the sequence of the plurality of shots define a boundary of each of the plurality of shots of the media content.

4. The system of claim 3, wherein the computer program instructions further cause the at least one processor to reshuffle the plurality of shots based on the sequence of the plurality of shots.

5. The system of claim 1, wherein the computer program instructions further cause the at least one processor to execute an affinity propagation clustering on the resultant similarity matrix.

6. The system of claim 5, wherein the computer program instructions further cause the at, least one processor to perform an automatic clustering of the plurality of shots based on the affinity propagation clustering of the multiple color features and the multiple audio features.

7. The system of claim 1, wherein
the plurality of shots includes a plurality of scenes, and
the computer program instructions further cause the at least one processor to execute a linear traversal algorithm on each of the plurality of shots to define boundaries of the plurality of scenes.

8. The system of claim 7, wherein the computer program instructions further cause the at least one processor to correct errors of the plurality of scenes based on the linear traversal algorithm.

9. The system of claim 7, wherein a threshold of a number of shots of the plurality of shots is similar between boundaries of two consecutive scenes of the plurality of scenes.

10. The system of claim 9, wherein the boundaries of the two consecutive scenes of the plurality of scenes are considered as a part of a same scene based on the threshold of the number of shots of the plurality of shots.

11. The system of claim 10, wherein the computer program instructions further cause the at least one processor to merge the two consecutive scenes into a single scene based on the boundaries of the two consecutive scenes of the plurality of scenes considered as the part of the same scene.

12. A computer implemented method comprising instructions stored on a non-transitory computer readable storage medium and executed on a system comprising hardware processor, memory and a key detection engine operably coupled to at least one processor for automatically detecting and marking logical scenes in media content, the method comprising steps of:
extracting a middle frame of each of a plurality of shots, wherein the plurality of shots are accessed from the media content;
extracting multiple color features from the middle frame to generate an image similarity matrix;
extracting multiple audio features from the audio content of each of the plurality of shots to generate an audio similarity matrix, wherein generating the audio similarity matrix comprises extracting an audio feature vector using a deep learning model and performing a principal component analysis for reducing the size of the input audio feature vector and providing an embedding audio feature vector;
generating a resultant similarity matrix based on the image similarity matrix and the audio similarity matrix; and
performing a noise reduction on the resultant similarity matrix by applying a distance cost, function and a kernel function to the resultant similarity matrix, thereby converting the distance matrix to an output resultant similarity matrix with a reduced noise.

13. The method of claim 12, wherein the noise reduction process controls overlapping of scene boundaries of two consecutives scenes of the plurality of shots.

14. The method of claim 12, wherein the noise reduction process further controls a video discontinuity in a scene of a plurality of scenes of the plurality of shots.

15. The method of claim 12, further comprises generating a sequence of the plurality of shots based on the output, wherein the sequence of the plurality of shots to define a boundary of each of the plurality of shots of the media content.

16. The method of claim 15, further comprises reshuffling the plurality of shots based on the sequence of the plurality of shots.

17. The method of claim 12, further comprises executing an affinity propagation clustering on the resultant similarity matrix.

18. The method of claim 17, further comprises performing an automatic clustering of the plurality of shots based on the affinity propagation clustering of the multiple color features and the multiple audio features.

* * * * *